(12) United States Patent
Mertens et al.

(10) Patent No.: US 8,080,944 B2
(45) Date of Patent: Dec. 20, 2011

(54) IGNITION DEVICE (75) Inventors: Ferdinand Mertens, Arnsberg (DE); Reinhard Schauerte, Meschede (DE); Tobias Schulte, Meschede (DE)

(73) Assignee: BAG electronics GmbH (DE)

( * ) Notice: Subject to any disclaimer, the term of this patent is extended or adjusted under 35 U.S.C. 154(b) by 795 days.

(21) Appl. No.: 11/575,735

(22) PCT Filed: Aug. 3, 2005

(86) PCT No.: PCT/DE2005/001364
§ 371 (c)(1), (2), (4) Date: Sep. 25, 2007

(87) PCT Pub. No.: WO2006/032228
PCT Pub. Date: Mar. 30, 2006

(65) Prior Publication Data
US 2008/0174252 A1    Jul. 24, 2008

(30) Foreign Application Priority Data

Sep. 22, 2004   (DE) .......................... 10 2004 045 834

(51) Int. Cl.
*H05B 37/00* (2006.01)
*H05B 41/16* (2006.01)
(52) U.S. Cl. ....................................... 315/206; 315/276
(58) Field of Classification Search .......... 315/84.51, 315/206, 208, 246, 276, 268, 270, DIG. 7
See application file for complete search history.

(56) References Cited

U.S. PATENT DOCUMENTS

| | | | | |
|---|---|---|---|---|
| 4,234,822 A | * | 11/1980 | Garrison et al. | 315/209 R |
| 4,479,076 A | * | 10/1984 | Yamaoka et al. | 315/241 P |
| 5,530,321 A | * | 6/1996 | Sears | 315/283 |
| 5,579,197 A | * | 11/1996 | Mengelt et al. | 361/93.4 |
| 5,615,093 A | * | 3/1997 | Nalbant | 363/25 |

(Continued)

FOREIGN PATENT DOCUMENTS

DE    19531622 A1    3/1997

(Continued)

OTHER PUBLICATIONS

PCT International Application Search Report dated Dec. 2, 2005 from corresponding PCT Application No. PCT/DE2005/001364 filed Aug. 3, 2005.

(Continued)

*Primary Examiner* — Douglas W Owens
*Assistant Examiner* — Minh D A
(74) *Attorney, Agent, or Firm* — Grossman Tucker Perreault & Pfleger PLLC (57) ABSTRACT

An ignition circuit arrangement and method for a discharge lamp, with which there is associated a supply circuit for providing an ac supply voltage to the lamp, includes an ignition transformer which is connected to a trigger circuit on the primary side and to the lamp on the secondary side for transmitting an ignition pulse; an input energy source for the ignition trigger circuit; a first switch means in the trigger circuit and a control means which actuates the first switch means. To assist with the ignition process, an energy storage means controllable by the control means, in particular a voltage source controllable by the control means, is arranged in the supply circuit in series with the gas-discharge lamp. The controllable energy storage means serves to provide an additional energy supply during the ignition process beyond the actual ac supply for the lamp.

18 Claims, 6 Drawing Sheets

U.S. PATENT DOCUMENTS

| | | |
|---|---|---|
| 6,008,591 A | 12/1999 | Huber et al. |
| 6,104,147 A * | 8/2000 | Nakamura et al. ............ 315/289 |
| 6,323,603 B1 | 11/2001 | Persson |
| 6,323,604 B1 | 11/2001 | Boenigk et al. |

FOREIGN PATENT DOCUMENTS

| | | |
|---|---|---|
| DE | 29806901 U1 | 11/1998 |
| EP | 0506543 A1 | 9/1992 |
| EP | 0868115 A2 | 3/1998 |

OTHER PUBLICATIONS

International Preliminary Report on Patentability and Written Opinion with English translation issued in corresponding PCT application PCT/DE2005/001364 (7 pages).

* cited by examiner

IGNITION DEVICE

The invention concerns an ignition circuit arrangement for ignition of a gas-discharge lamp, in particular a high-pressure gas-discharge lamp, having the features of the classifying portion of claim 1, and a method of igniting such a lamp.

In particular high-pressure gas-discharge lamps, when starting, require an ignition voltage which is far above the supply voltage for maintaining the discharge. Typically, in a cold-start situation, ignition voltage pulses involve an ignition voltage of about 1 kV to 5 kV, depending on the respective lamp being used. By virtue of the increased pressure at elevated temperature, very much higher ignition voltages are required for hot ignition of high-pressure gas-discharge lamps, they are approximately in the range of ten to sixty kV, depending on the respective material to be ionised which is used and the power of the lamp.

Conventional high-voltage ignition devices for high-pressure gas-discharge lamps are generally designed in the form of a superimposition ignition circuit. Such an ignition circuit is disclosed for example in German laid-open application DE 195 31 622. It includes a pulse transformer whose secondary side is connected to the lamp to be ignited and whose primary side is connected to a circuit triggering the ignition pulse.

In order to ensure reliable ignition of high-pressure gas-discharge lamps the ignition pulses are generally of a width of one to a few microseconds and are repeated over a number of mains half-waves, which leads to a repetition rate of about 100 Hz. In general the entire ignition operation lasts in the region of seconds so that in particular the ignition transformer has a high inductance, which on the one hand adversely influences the amount of space required by such an ignition circuit and which on the other hand leads to acoustic loadings upon magnetisation reversal of the core. The high level of electrical energy which is to be used for the ignition procedure is linked to a high level of waste heat. European patent application EP 0868115 A2 discloses an ignition circuit of the general kind set forth. That is intended under some circumstances also to be suitable for hot ignition procedures in which an ignition voltage of up to over 20 kV is required.

The object of the invention is to further improve the ignition of gas-discharge lamps in the case of ignition circuits of the general kind set forth, in particular in the hot ignition of the lamp.

The invention attains that object in a surprisingly simple fashion with an ignition circuit arrangement having the features of claim 1 and with a method of igniting a gas discharge lamp having the features of claim 13.

In regard to the apparatus the invention provides an ignition circuit arrangement for the ignition of a gas-discharge lamp, in particular a high-pressure gas-discharge lamp, with which there is associated a supply circuit for providing an ac supply voltage to the lamp. The ignition circuit arrangement includes an ignition transformer which is connected to a trigger circuit at the primary side and to the lamp at the secondary side for transmitting an ignition pulse; an input energy source for the ignition trigger circuit; a first switch means in the trigger circuit and a control means which actuates the first switch means. The ignition circuit arrangement according to the invention is distinguished in that to assist with the ignition process in the supply circuit an energy storage means which is controllable by the control means, in particular a voltage source which is controllable by the control means, is arranged in series with the lamp.

In that case the controllable energy storage means serves to provide an additional electrical supply during the ignition process beyond the actual ac supply of the lamp. That surprisingly simple measure provides that discharge in the lamp can generally already be produced with a higher level of probability at the first ignition attempt, and maintained. The configuration according to the invention of the ignition circuit arrangement provides that in addition it is possible to save on energy as the ignition circuit arrangement according to the invention generally manages with fewer ignition pulses than conventional ignition circuit arrangements. The same also applies in regard to the hot ignition of high-pressure gas-discharge lamps, which hitherto represented a major problem, in particular in the case of lamps with high levels of power. The consequence of the configuration according to the invention of the ignition circuit arrangement is that the electrical components for the ignition circuit arrangement can be of smaller dimensions, which reduces greatly both the amount of space required and also the costs involved. Finally that affords new possible uses for high-pressure gas-discharge lamps, for example in the private sector.

The invention is based on the idea, during the production of the ignition pulse to the lamp, of providing that there is an electrical supply which goes beyond the conventional ac supply for the lamp so that the plasma produced is additionally supported, whereby finally that increases the probability of an ignition attempt being successful. That support for the plasma towards a stable discharge further has the advantage that, with the ignition circuit arrangement according to the invention, in comparison with conventional circuits, it is possible to operate with lesser ignition voltages so that in that way the demands on the electronic and electrical components are also frequently reduced.

Advantageously the first switch means can be actuated by the control means within a time interval for opening and closing within at least one supply voltage half-wave after a predetermined instantaneous value of the supply voltage is exceeded, whereby at least one ignition pulse can be produced. That measure provides that ignition is started at such times at which the supply voltage is above the burning operating voltage of the lamp which is necessary to maintain the discharge.

Depending on the respective design configuration involved, one or also a plurality of primary-side pulses can be produced within the predetermined interval in a supply voltage half-wave by suitable actuation of the first switch means. In that respect it is preferable for the above-stated reasons to produce as few pulses as possible within the supply voltage half-wave. Depending on the respective lamp used however it may also be advantageous to produce a plurality of such primary-side pulses in quick succession in order to ensure that the lamp ignites.

In principle the ignition circuit arrangement according to the invention can be designed without an ignition capacitor arranged in parallel with the lamp. In general, because of the stray capacitance which in reality is always present in parallel with the lamp, at a triggering pulse produced at the primary side, a damped oscillation occurs at the secondary side in relation to the ignition transformer. It may therefore be advantageous if the actuation frequency for the first switch means for producing ignition pulses changes within the time interval in a supply voltage half-wave, wherein the actuation frequency is greater than 290 kHz. That makes it possible to prevent the excitation of plasma oscillations which impede ignition.

In particular electronic switches which have switching times of less than 1 µs are suitable as the switch means.

Preferably there can be provided a current path which by-passes the gas-discharge lamp for charging the energy storage means, having a second switch means actuated by the control means. In that case the charging current path can be for example directly or indirectly connected in parallel with respect to the gas-discharge lamp. The provision of the charging current path means that the energy storage means, for assisting with the ignition process, depending on the respective use involved, quite specifically for the respective requirement concerned, can be provided with the required energy which can be taken from the supply circuit prior to ignition of the lamp. An electronic controllable switch such as a bipolar or a field effect transistor can be provided for controlling the charging-up process, wherein the current path can be opened or closed respectively by way of the transistor switch. In that respect, the energy stored in the energy storage means for assisting with the ignition operation can be established by way of the charging time.

In principle the ignition circuit arrangement according to the invention can be used both in relation to conventional ballast devices (CBD) and also electronic ballast devices (EBD). The choke which in the case of CBDs is arranged in the supply circuit in series with the lamp for the purposes of current limitation can advantageously be used in the ignition circuit arrangement according to the invention as the above-mentioned energy storage means which pre-loaded and controlled acts to assist with ignition.

In order to afford an even higher level of flexibility when setting the ignition process, it can be provided that the input energy source for the ignition trigger circuit, in particular a voltage source associated with the ignition trigger circuit, is variably adjustable by the control means. In that respect there is thus additionally the option of adjusting the level of the ignition pulse when required, more specifically both by way of example in unitary fashion in relation to a sequence of ignition pulses and also in differing fashion. The level of the ignition voltage can thus be basically adjusted to the respective lamp to be started and the operating condition thereof. In addition the ignition circuit arrangement according to the invention also allows the production of a plurality of ignition pulses involving different voltage levels within a single ignition process. Under some circumstances that can be appropriate when, after ignition of the plasma with a high ignition voltage, for example in a subsequent supply voltage half-wave, one or more ignition pulses are produced with a lower ignition voltage, to assist with or fully form the plasma formed in the preceding half-wave.

It may be desirable if there is provided a means for detecting the charging current and/or the charging voltage of the energy storage means. That provides that in particular the energy content of the energy storage means which supports the ignition process can be ascertained directly, whereby the ignition process can be very accurately controlled. By way of example the second switch means with which the current path for charging the energy storage means is closed or opened can be controlled in response, that is to say in dependence on the charge condition of the energy storage means.

It may further be appropriate if the actuation frequency of the first switch means within the time interval changes from a predetermined lower frequency in the direction of higher frequencies. That change can advantageously take place up to a predetermined upper frequency, in which case the change can be implemented in steps and also continuously. Particularly advantageous actuation frequencies for the first switch means, in respect of the production of an arc which is of a uniform configuration and stable, are between 290 kHz and 700 kHz or between 800 kHz and 5 MHz.

It is desirable if the time interval within which the at least one ignition pulse is produced is established by the period of time between the moment of reaching a predetermined instantaneous value and the moment of reaching a predetermined limit value in respect of the supply voltage. Such a limit value can be for example the peak voltage of the supply voltage. In that case, as already stated hereinbefore, the predetermined value is above the burning operating voltage necessary to maintain the arc discharge. That therefore ensures that the lamp is ignited only at those moments in time at which the supply voltage is above the burning operating voltage of the lamp and the supply voltage is rising. Depending on the respective configuration involved, the time interval for the ignition pulses can be prolonged by the factor of 2 within a supply voltage half-wave by virtue of the fact that the period of time between the attainment of the peak voltage of the supply voltage and the further drop in the voltage until the predetermined minimum value is reached is also used for the ignition process.

In respect of the process, the invention attains the foregoing object with a method of igniting a gas discharge lamp which in operation is supplied with electrical energy by means of an ac supply circuit, having the features of claim 13. In that case at least one ignition pulse is produced by an ignition circuit arrangement having an ignition transformer. The method according to the invention is distinguished in that to assist with the ignition process prior to the production of the at least one ignition pulse a controllable energy storage means which is arranged in the supply circuit is charged up and the energy stored in the controllable energy storage means is superimposed in the ignition process on the ac supply for the lamp.

The method according to the invention makes it possible to design small integratable ignition circuit arrangements both for cold ignition and also for hot ignition of high-pressure gas-discharge lamps.

In that respect it may be desirable if just a single ignition pulse is produced within a half-wave supply voltage so that particularly little energy has to be applied for ignition of the lamps. Frequently single switching on and off of a trigger circuit such as for example an IGBT (insulated gate bipolar transistor) or a field effect transistor is sufficient to implement ignition of the lamp. In addition in terms of production and stability of the arc, it may also be useful if, after the production of the one ignition pulse within a half-wave of the supply voltage, once again at least one further ignition pulse is produced subsequently within the subsequent half-wave upon the attainment of a predetermined instantaneous value of the supply voltage. Under some circumstances it may also be advantageous to produce a respective pulse within a plurality of half-waves of the supply voltage, which for example here occur in succession, in order to achieve reliable ignition of the lamp.

The ignition process can further be adjusted by varying the voltage of successive ignition pulses.

It is advantageous if a charging current path is connected for charging of the energy storage means prior to the production of the at least one ignition pulse, which charging current path is interrupted before the production of the first ignition pulse, in particular after the attainment of a predetermined charge condition of the energy storage means, which is detected during the charging operation.

Particularly in those cases in which the energy storage means is afforded by a coil such as a choke coil in a CBD ignition device, it may be advantageous if, after the conclusion of charging of the energy storage means and prior to the production of the at least one ignition pulse, by opening of the charging current path, a capacitor arranged in parallel with the lamp is charged up. In that way it is possible to provide that a large part of the energy stored in the coil prior to the ignition process is transferred into a capacitor which in addition to the alternating current applied to the lamp serves to supply the lamp during the ignition process.

The invention is described hereinafter by the description of some embodiments of the ignition circuit arrangement according to the invention with reference to the accompanying Figures in which.

Figure 1:
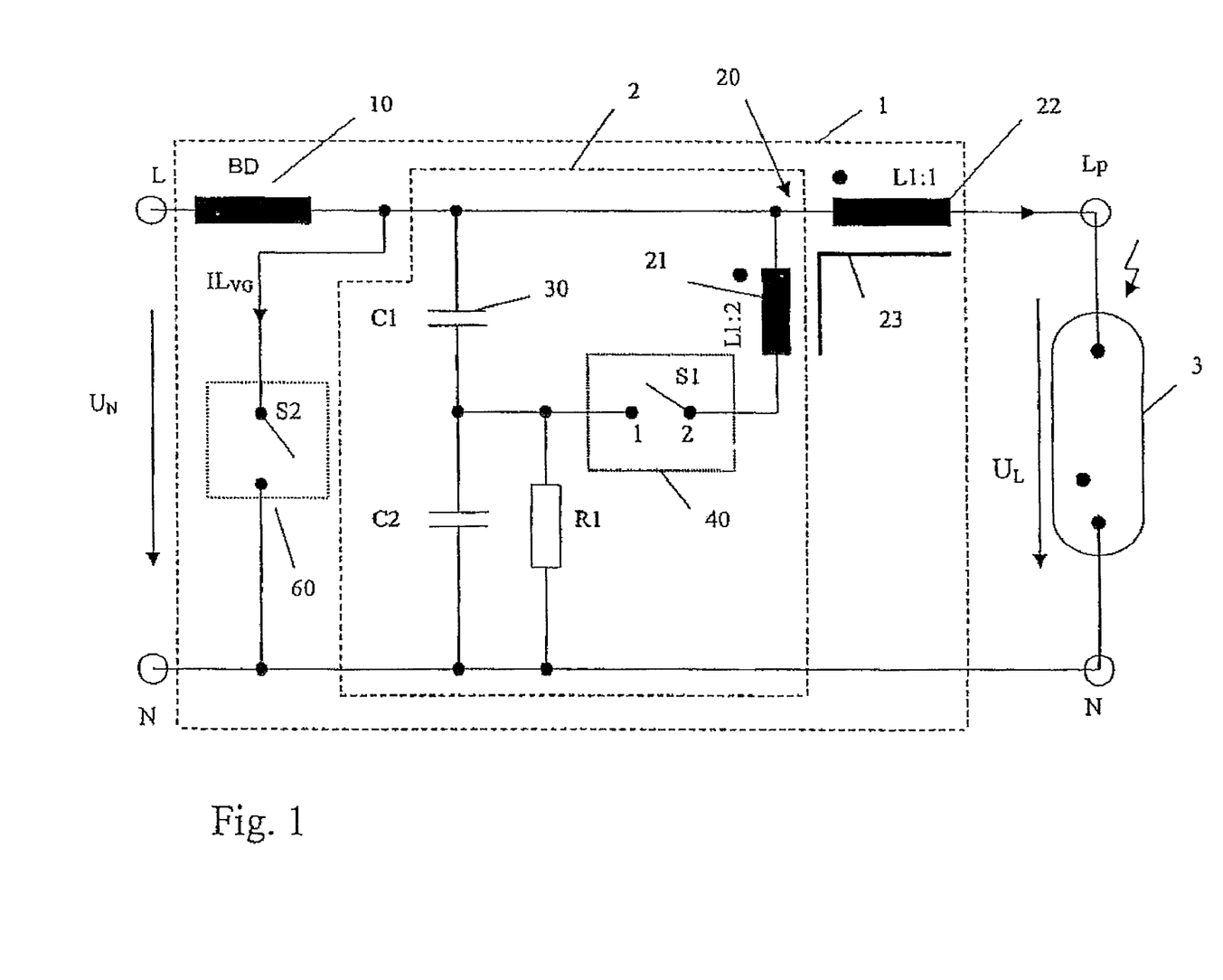
FIG. 1 is a diagrammatic view showing the principle of an ignition circuit arrangement designed in accordance with the invention in a first embodiment.

FIG. 1 shows an ignition circuit arrangement 1 according to the invention together with the high-pressure gas-discharge lamp 3 to be ignited. The mains voltage $U_N$ is applied at the input terminals L, N. The lamp 3 is supplied with electrical energy by way of a lamp choke 10 of a conventional CBD and the secondary-side coil winding 22 of an ignition transformer 20. The ignition trigger circuit 2 includes as essential components a surge capacitor 30 which can be charged up by way of the parallel circuit of a capacitor C2 and a resistor R1, and a primary-side coil winding 21 of the ignition transformer 20. The primary-side coil winding 21 is coupled by way of the ignition transformer core 23 to the secondary-side coil winding 22 which is connected in series with the lamp 3 for transmission and transformation of the ignition pulse. A first switch means with associated control is provided, as indicated by reference 40, in the trigger circuit 2, for triggering the ignition pulse. Furthermore the ignition circuit arrangement according to the invention has a current path which by-passes the lamp 3 and with which the choke 10 can be charged up with the mains voltage $U_N$ by actuation of a further switch means, independently of the lamp and the trigger circuit. In FIG. 1 the further switch means together with the control is indicated by reference 60.

As the man skilled in the art will be aware, the ignition circuit arrangement shown in FIG. 1 is in the form of a superimposition ignition device, by which the ignition voltages produced are superimposed on the electrical supply for the lamp 3. In the Figure the lamp current is identified by $I_L$ and the voltage drop across the lamp is identified by $U_L$. The charge current of the lamp choke 10 is denoted by $IL_{VG}$.

Figure 2:
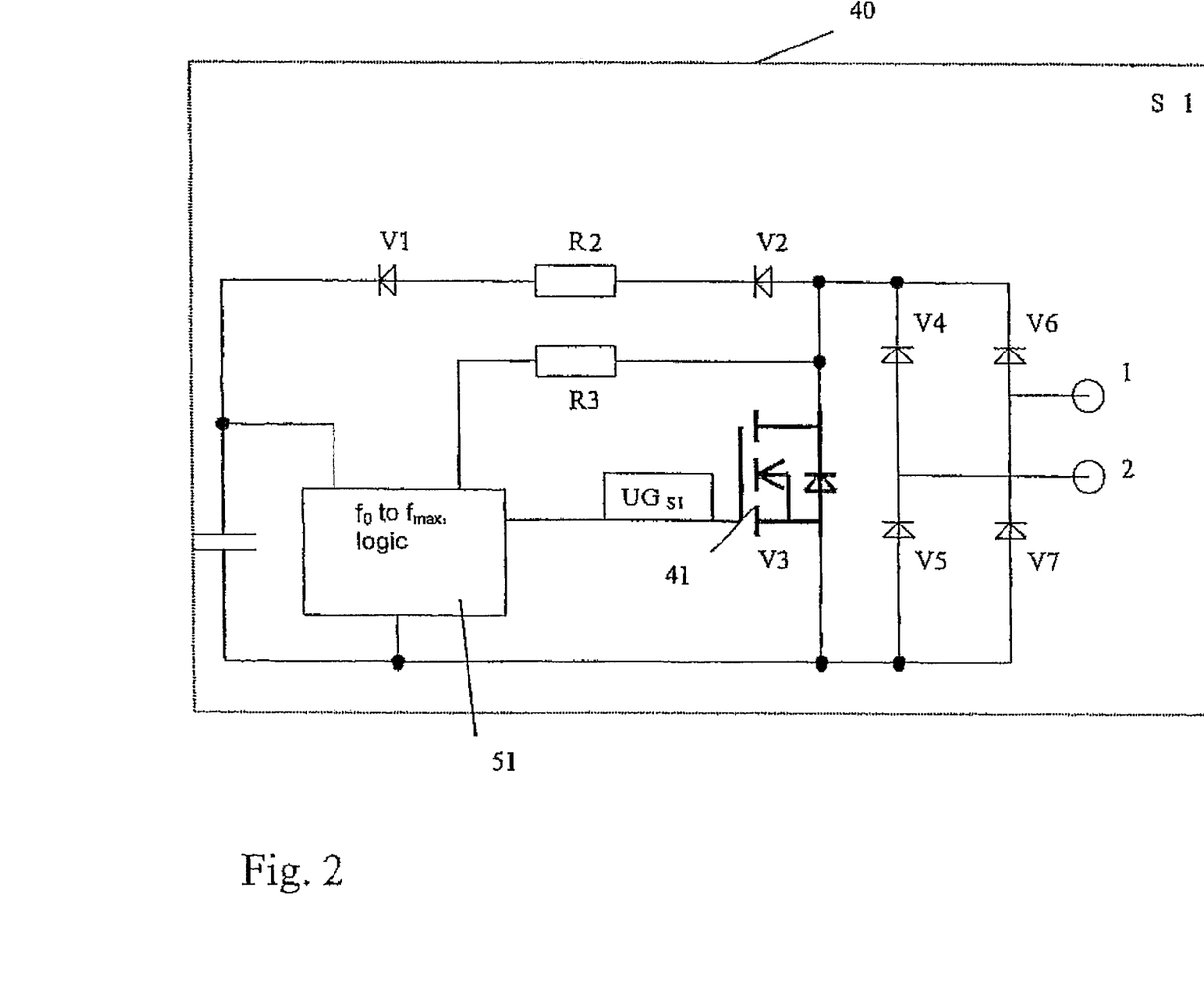
FIG. 2 is a detail view showing the design configuration of the first switch 40 of the ignition circuit arrangement shown in FIG. 1.

FIG. 2 shows a detail view of the switch means 40 (switch St). An essential element is a field effect transistor 41 whose gate voltage UDS1 is afforded by a control 51. That control is capable of actuating the transistor depending on the respective programming involved for once opening and closing to produce a single primary-side pulse and also for actuating the transistor to produce a plurality of pulses at one or more frequencies over a predetermined time interval. Four diodes V4 to V7 which are respectively connected in paired relationship in parallel with the transistor permit the mode of operation of the switch both in the positive and also negative half-wave of the supply mains.

The mode of operation of the ignition circuit arrangement according to the invention as shown in FIG. 1 will be described hereinafter. Prior to the first ignition attempt the lamp choke 10 is charged up over a predetermined period of time and thus with a predetermined amount of electrical energy, by the switch S2 in the second switch means 60 being actuated with the associated control to close the charging current path. In that situation the charging current $IL_{VG}$ flows into the lamp choke. The switch S2 is of a similar structure to the switch St shown in FIG. 2, only the control differs as the additional energy storage means in the form of the choke is charged up only once at the beginning of the ignition process in the described embodiment. After the attainment of the predetermined amount of energy in the choke 10 the switch S2 is opened again. In this respect the surge capacitor C1 can be subsequently charged up by way of the mains and the energy previously stored in the choke 10. At a moment in time at which the mains voltage is above the lamp burning operating voltage, the switch S1 is switched on and off again for once opening and closing it over a period of about one μsec. As a result the surge capacitor 30 which serves as the input energy source for the trigger circuit is discharged by way of the primary-side coil winding 21 of the ignition transformer 20. The magnetisation of the primary-side coil winding is transformed by way of the ignition transformer core 23 on to the secondary-side coil winding 22 with the transfer ratio of the ignition transformer, and superimposed on the mains voltage. A secondary-side ignition pulse thus occurs at the lamp 3 so that the lamp can ignite. If it does not ignite immediately, a decaying oscillation occurs on the supply line by virtue of the stray capacitance which is always present and which is in parallel with the lamp 3, in which case the oscillator circuit is closed by way of the capacitors C1 and C2 so that the lamp choke 10 is not loaded with the ignition voltage.

Figure 3:
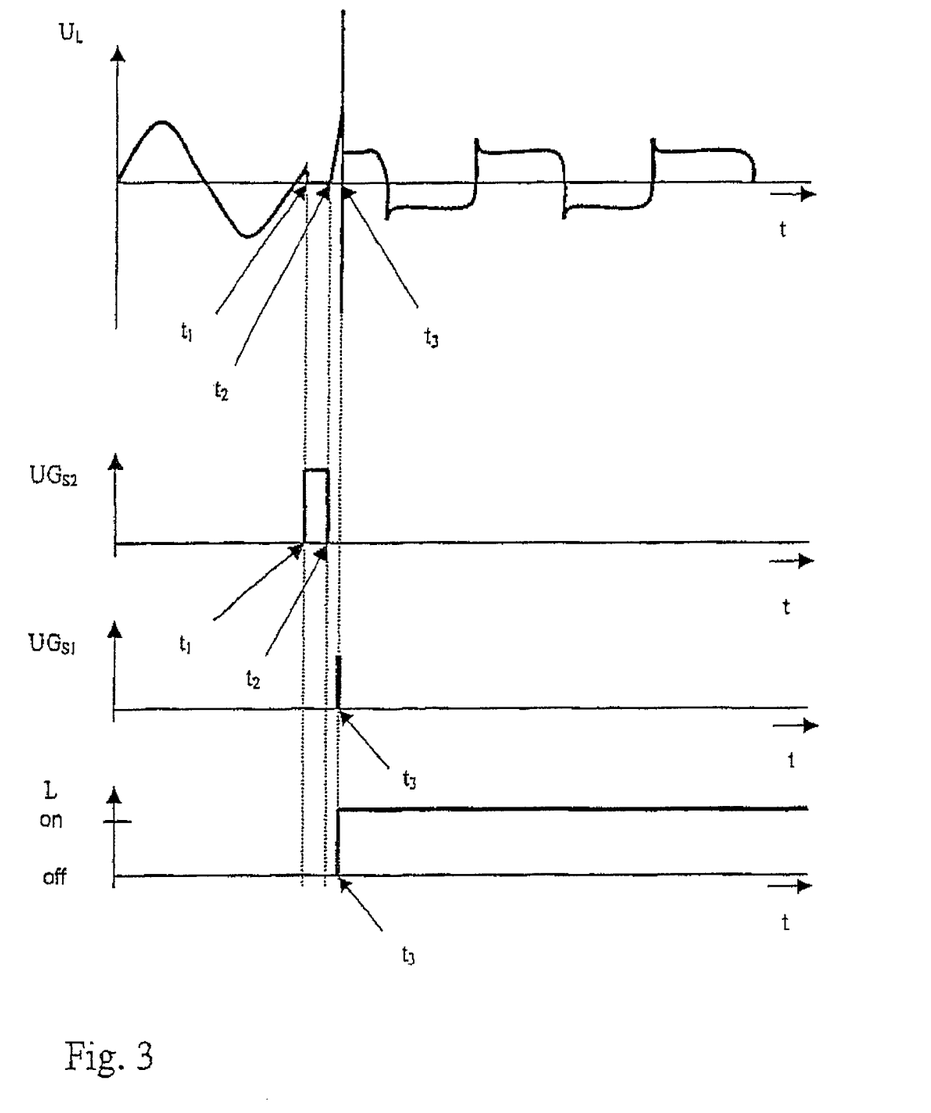
FIG. 3 shows the variation in relation to time of an ignition process for the circuit shown in FIG. 1.

The variation in respect of time of the ignition is shown in FIG. 3. In that case UL denotes the lamp voltage, UGS1 denotes the gate voltage of the field effect transistor V3, UGS2 denotes the gate voltage of the field effect transistor of the second switch S2 and L indicates whether the high-pressure gas-discharge lamp is or is not burning. As can be seen from the Figures the lamp initially does not burn, that is to say UL corresponds to the configuration of the mains voltage UN. At the time T1 the switch S2 is closed so that the choke 10 can be charged up, in that respect the lamp voltage UL collapses at T1. At the time T2 the switch S2 is opened again and the lamp voltage again rises. If the lamp voltage is greater than the burning operating voltage of the lamp the switch S1 in the trigger circuit is closed at the time T3 so that an ignition pulse produced on the supply side is superimposed on the supply voltage. In the period between T3 and T2 the energy previously stored in the choke 10 is at least partially delivered to the capacitor C1 so that it is now additionally available to produce the ignition pulse and for the supply and finally with a high level of probability the lamp already burns at the first ignition pulse, see the last time graph L in FIG. 3. After firing of the lamp the situation involves the characteristic rectangular shape for the lamp burning operating voltage.

Typical switching times or durations with the ignition circuit arrangement according to the invention are approximately some ten to one thousand microseconds for the charging time of the choke 10, some up to some 10 microseconds for charging of the capacitor C1 by way of the mains supply and the choke and about one microsecond for the switching duration of the transistor in the trigger circuit. In the FIG. 1 embodiment the inductance of the lamp choke 10 is about 0.5H, the capacitance of the capacitors C1 and C2 is about 220 nF and 100 nF respectively and the inductance L1 and L2 of the ignition transformer is about 10 μH and 1 mH respectively. By virtue of the stray capacitances already referred to hereinbefore, a damped ignition pulse oscillation is produced at the supply side by the individual primary-side pulse. That can be seen in FIG. 3 in the view of UL where a negative ignition pulse is shown after the occurrence of a positive pulse. After initiation of the discharge that damped oscillation is abruptly terminated, which is revealed at the subsequent characteristic rectangular burning operating voltage configuration.

The ignition circuit arrangement shown in FIG. 1 is suitable both for cold ignition and also hot ignition of high-pressure gas-discharge lamps. Particularly in the case of lamps which are particularly difficult to ignite hot, the control logic 51 can be actuated after charging of the choke 10 for multiple production of ignition pulses within a single supply voltage half-wave or also in a plurality of successive supply voltage half-waves. In addition, to assist with the ignition process, it is also possible to vary the switch in the trigger circuit in respect of its frequency in order to achieve optimum possible ignition conditions. By way of example the actuation frequency for the switch S1 can be between 290 kHz and 700 kHz or between 800 kHz and 5 MHz. In that case, unlike the embodiment described hereinbefore, a plurality of ignition pulses is produced until the discharge is attained, which naturally involves an increased amount of energy. In that case the electronic components are to be designed appropriately.

Figure 4:
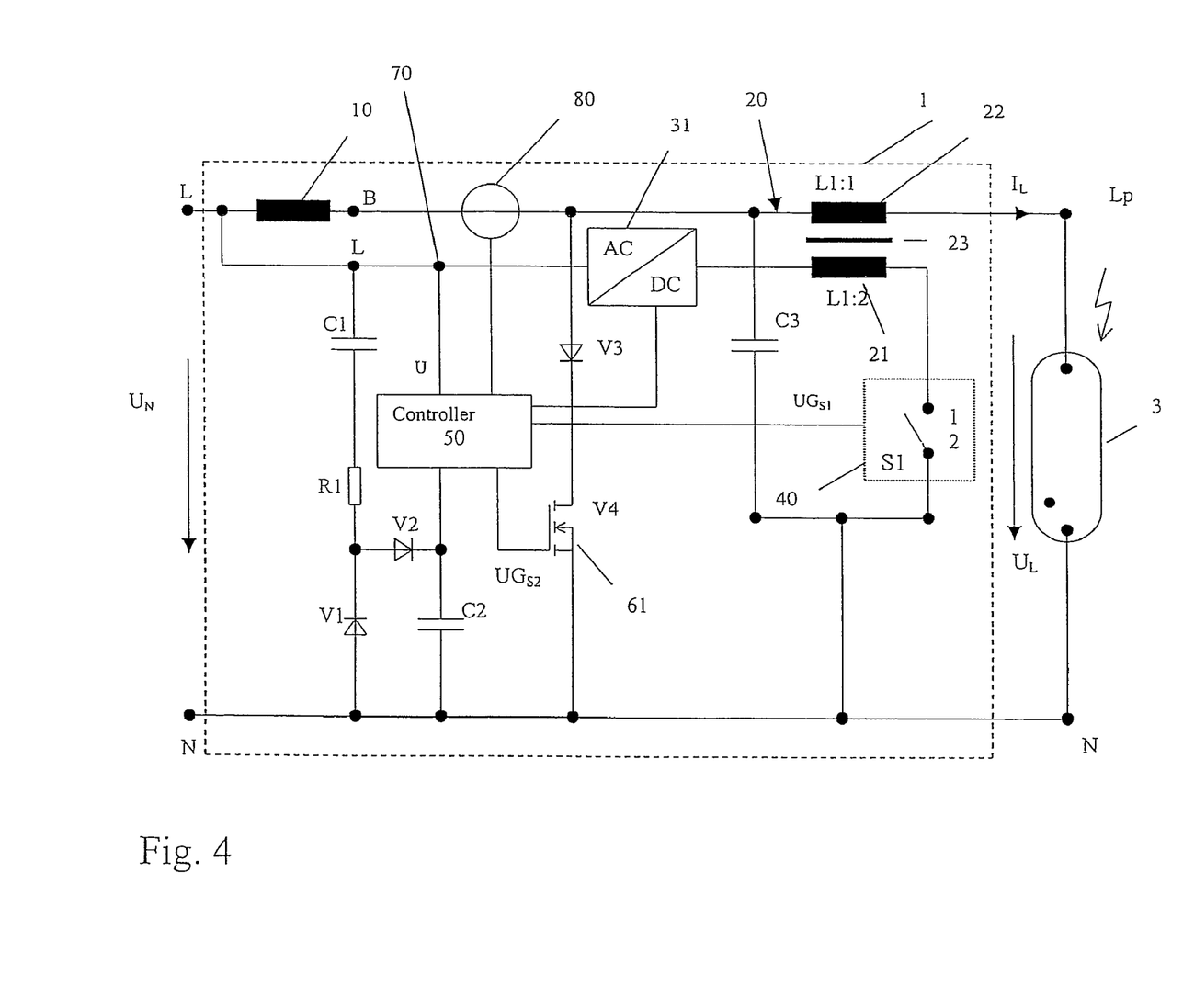
FIG. 4 shows an ignition circuit arrangement in accordance with the invention in a second embodiment.
Figure 5:
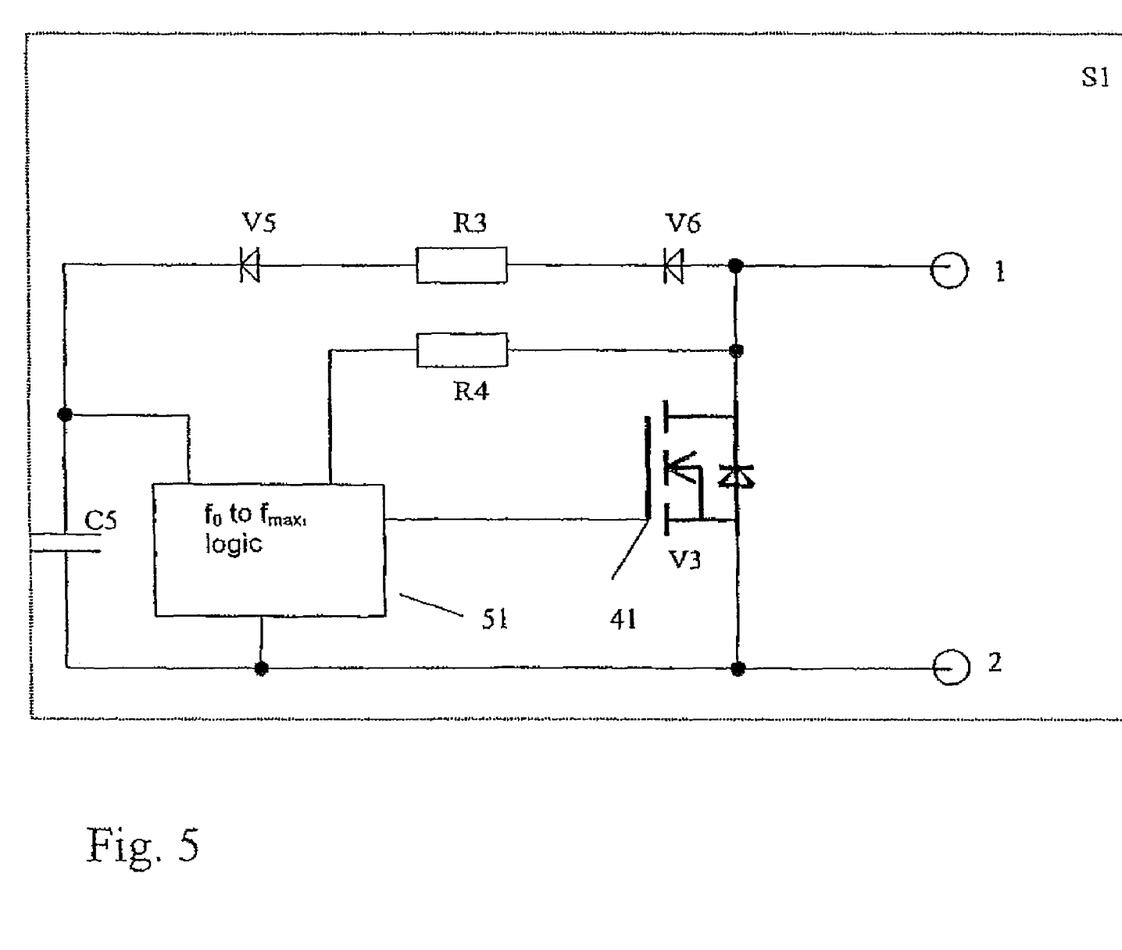
FIG. 5 shows a detail view illustrating the configuration of the first switch 40 of the ignition circuit arrangement shown in FIG. 4.

FIG. 4 shows a further embodiment of an ignition circuit arrangement according to the invention. Components which are identical or similar in terms of function are denoted by the same references as in FIG. 1. In the case of this ignition circuit arrangement also, the trigger circuit is coupled to the lamp by way of an ignition transformer 20 having a primary-side winding 21 and a secondary-side winding 22. The voltage supply for the trigger circuit is afforded by a controllable rectifier 31. All essential control means are combined together in a single controller 50 which actuates the switch St in the trigger circuit and the field effect transistor 61 in the charging current path for the lamp choke 10 by way of the gate lines thereof. The supply current and the instantaneous value of the mains voltage are detected by way of measuring devices 80, 70 and fed to the controller 50. In that respect for example during charging of the choke 10 it is possible to measure the charging condition thereof so that the energy additionally afforded for ignition can be adjusted with a high level of accuracy. The components C1, R1, V1, V2 and C2 serve to supply the controller. Unlike the embodiment shown in FIG. 1 the switch St is of a single-pole configuration, see FIG. 5, as the input voltage of the trigger switches is provided by the controlled rectifier 31. The parallel connection of the capacitor C3 with respect to the lamp 3 serves once again as a high-frequency feedback capacitor arrangement in order not to load the choke 10 with the high-voltage pulse. In addition, prior to ignition and after charging of the energy storage means 10 a part of the energy stored therein is recharged into the capacitor C3, wherein that additional energy, in accordance with the invention, serves to promote the production of the discharge in the lamp 3 during the ignition process.

As can be seen from FIG. 4 the supply voltage for the controlled rectifier 31 and the control 50 is taken off at the connection of the choke 10, that is remote from the lamp. In a further embodiment of the invention which is not shown here, those supply voltages are taken off at the other connection of the choke, that is to say the connection which is towards the lamp and which is identified by the letter 'B' in FIG. 4. That makes it possible to reduce the number of necessary connection cables.

The ignition circuit arrangement shown in FIG. 4 operates substantially like that shown in FIG. 1. A difference is that the controller 50 controls the energy supply voltage for the trigger circuit and in that respect the level of the ignition pulse can be very accurately adjusted. Closure of the switch S1 means that a current flows from the rectifier 31 to earth by way of the primary winding 21 of the ignition transformer 20 and the closed switch S1, whereby an ignition pulse is produced by way of the secondary winding 22 in the supply line in a similar manner to that described hereinbefore.

As in the first embodiment the switch S1 can be used to produce a single primary-side pulse, but also to produce a pulse sequence at predetermined and/or varying frequency. In addition, the energy which is additionally available in the ignition process for the discharge can be established by way of the controller 50 by adjusting the charging time for controlled charging of the choke 10 in dependence on the dimensioning of the choke and the capacitor C3. In that respect the various ignition parameters can be very accurately adjusted in dependence on the connected lamp, which in turn permits reliable ignition of the lamp with the lowest possible energy expenditure and thus circuitry complication and expenditure, irrespective of whether the lamp is to be ignited cold or hot. In an embodiment which is not shown here the control recognises when hot ignition is necessary and thereupon adjusts the ignition parameters such as the switching times of the two switches, the number of primary-side pulses and for example the level of the input voltage of the trigger circuit.

Figure 6:
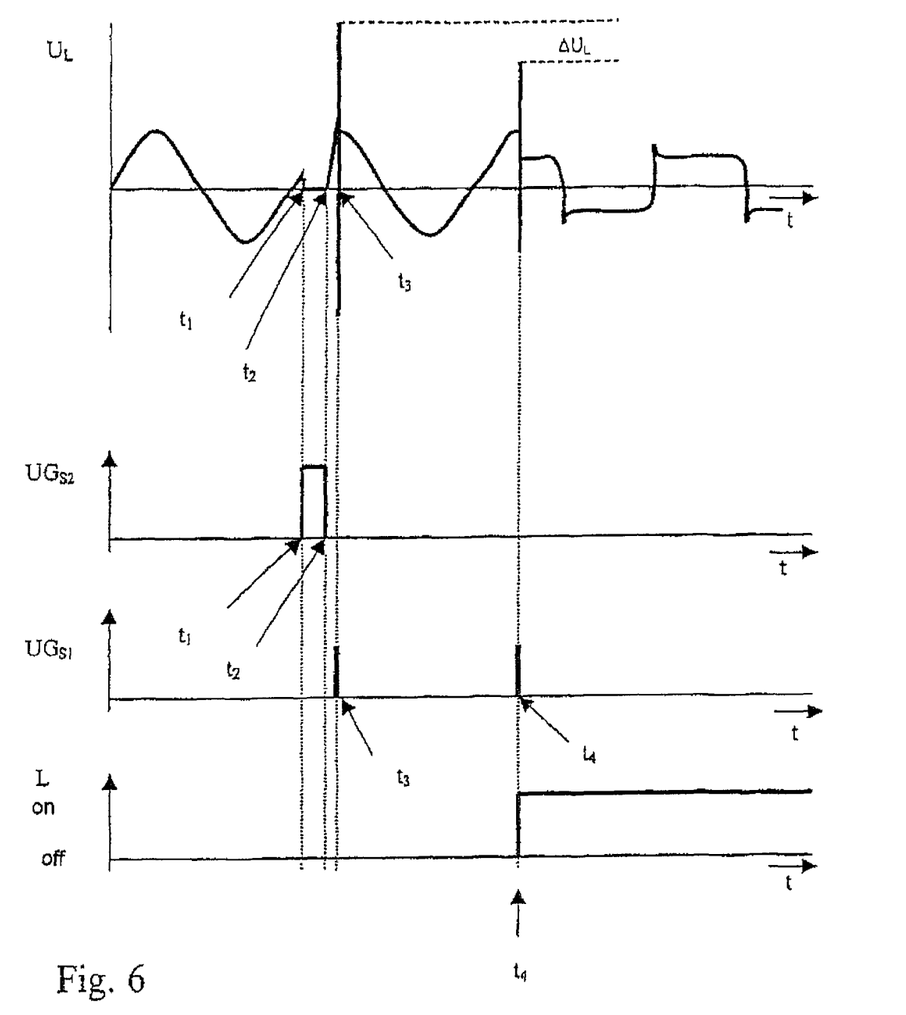
FIG. 6 shows the variation in respect of time of an ignition process for the circuit shown in FIG. 4.

FIG. 6 shows the variation in respect of time of the ignition process in the case of the ignition circuit arrangement according to the invention shown in FIG. 4. Once again the variations in respect of time of the lamp voltage are indicated at UL, the gate actuation voltages at UGS1, UGS2 and the condition of the lamp at L. The illustrated example also provides that, after charging of the storage means 10 within the period of time (T2–T1) and subsequent build-up of the mains voltage at the lamp or discharge of the additional energy storage means 10 into the capacitor C3 within the mains voltage half-wave a single primary-side pulse is produced at the time T3. As described hereinbefore the circuit arrangement reacts on the secondary side on the supply line with the production of a damped ignition pulse oscillation. In the configuration shown in FIG. 6 however the lamp is still not burning after the first ignition pulse, which is indicated by the subsequent sinusoidal configuration of the lamp voltage. Admittedly complete discharge is not achieved by the first ignition pulse, but partial ionisation of the gas. In the illustrated example discharge is produced only with a subsequent ignition pulse by suitable actuation of the switch St at the time T4. As can be seen from the condition configuration of the lamp L and the lamp voltage $U_L$, the discharge starts after the second primary-side pulse which is superimposed on the supply voltage at the secondary side as the ignition pulse. It can be seen from the illustration of $U_L$ that the second ignition pulse at the time T4 is smaller than the first one. That is achieved by virtue of the fact that the controller 50 actuates the controllable rectifier 31 for the second pulse in the second supply voltage half-wave for the delivery of an input voltage which is smaller in comparison with the first pulse, for the trigger circuit, so that the two secondary-side voltage pulses differ by the amount $\Delta U_L$, as shown in FIG. 6. By way of example, for cold starting of a high-pressure gas-discharge lamp, the circuit must be sufficient to produce a secondary-side ignition pulse of a thousand volts at the time T3 and an ignition pulse of 700 volts at the time T4 as it is known that the connected lamp still ignites under the specified conditions. In that way the electronic components or the lamp can be treated carefully, which increases their service life.

The man skilled in the art will see that, in the case of the ignition circuit arrangement according to the invention as shown in FIG. 4, the trigger circuit can also be used to produce a plurality of ignition pulses of fixed or variable frequency. In addition it should be pointed out that the ignition circuit arrangement shown in FIG. 4 is adapted to produce ignition pulses within a positive half-wave of the supply voltage. If accordingly ignition pulses are to be produced in successive half-waves, the embodiment shown in FIG. 4 provides that, between half-waves with produced pulses, there is always a negative half-wave in which no ignition pulses can be produced. However the man skilled in the art is readily aware of design options with which that disadvantage can be circumvented. For example, with the embodiment shown in FIG. 1, by virtue of the bipolar character of the trigger circuit, it is possible to produce ignition pulses in successive and adjacent half-waves of the supply voltage.

LIST OF REFERENCES 1 ignition circuit arrangement
2 trigger circuit
3 high-pressure gas-discharge lamp
10 energy storage means, lamp choke
20 ignition transformer
21 primary-side coil winding/coil
22 secondary-side coil winding/coil
23 ignition transformer core
30 surge capacitor
31 controllable rectifier
40 first switch means with control
41 FET
50 control means, controller
51 control for switch S1
60 second switch means with control
61 field effect transistor (FET)
70 detection means for instantaneous value of the mains voltage
80 detection means for charging current/lamp current
$I_L$ lamp current
$I_L$VG charging current of the ballast device (BD)
$UG_{S1}$ gate actuation of the switch S1
$UG_{S2}$ gate actuation of the switch S2
$U_N$ mains voltage
$U_L$ burning operating voltage
S1, S2 switch
(T2−T1) charging time
T3 first ignition pulse time
T4 second ignition pulse time

What is claimed is:

1. An ignition circuit arrangement for the ignition of a gas-discharge lamp with which there is associated a supply circuit for providing an ac supply voltage ($U_N$) to the lamp, comprising:
    an ignition transformer having a primary side and a secondary side, a trigger circuit electrically coupled to the primary side, the lamp electrically coupled to the secondary side, said ignition transformer configured to transmit an ignition pulse;
    an input energy source for the ignition trigger circuit;
    a first switch in the trigger circuit;
    a voltage source, in series with the lamp, configured to provide an additional electrical supply during the ignition process beyond the AC supply of the lamp to assist in the ignition process of the lamp;
    a controller configured to control the first switch, said controller is further configured to control said voltage source during the ignition process of the lamp; and
    a current path configured to bypass the gas-discharge lamp for charging the voltage source, said current path comprises a second switch controlled by the controller.

2. An ignition circuit arrangement according to claim 1, further comprising a circuit for detecting the instantaneous value of the supply voltage, wherein the first switch is actuated by the controller within a time interval for opening and closing within at least one half-wave of the supply voltage after a predetermined instantaneous value of the supply voltage is exceeded.

3. An ignition circuit arrangement according to claim 2, wherein the actuation frequency for the first switch varies within the time interval, and wherein the actuation frequency is greater than 290 kHz.

4. An ignition circuit arrangement according to claim 3, wherein the actuation frequency of the first switch varies within the time interval from a predetermined lower frequency in the direction towards higher frequencies.

5. An ignition circuit arrangement according to claim 4, wherein the actuation frequency of the first switch increases within the time interval to a predetermined upper frequency.

6. An ignition circuit arrangement according to claim 5, wherein the time interval is established by the period of time between the moment of reaching the predetermined value and the moment of reaching a predetermined limit value, in particular the peak voltage of the supply voltage.

7. An ignition circuit arrangement according to claim 2, wherein the actuation frequency of the first switch is between 290 kHz and 700 kHz or between 800 kHz and 5 MHz.

8. An ignition circuit arrangement according to claim 3, wherein the actuation frequency of the first switch changes continuously within the time interval.

9. An ignition circuit arrangement according to claim 1, wherein said voltage source comprises an energy storage means, said energy storage means comprises a choke.

10. An ignition circuit arrangement according to claim 9, further comprising a circuit for detecting the charging current and/or the charging voltage of the energy storage means.

11. An ignition circuit arrangement according to claim 1 wherein the input energy source for the ignition trigger circuit include said voltage source and is variably adjustable by the controller.

12. A method of igniting a gas-discharge lamp which in operation is supplied with electrical energy by means of an ac supply circuit, said method comprising:
    generating at least one ignition pulse by means of an ignition circuit arrangement having an ignition transformer charging a controllable energy storage means, coupled in series with the gas discharge lamp, configured to provide an additional electrical supply during the ignition process beyond the AC supply of the lamp to assist with the ignition process prior to the production of the at least one ignition pulse; and
    superimposing at least a part of the energy stored in the controllable energy storage means on the ac supply of the lamp in the ignition process;
    wherein a charging current path configured to bypass the gas-discharge lamp is connected for charging the chargeable energy storage means prior to the production of the at least one ignition pulse, wherein said charging current path is interrupted prior to the production of the first ignition pulse, said charging current path comprising a switch controlled by the controller.

13. A method according to claim 12, wherein a single ignition pulse is produced within a half-wave of the supply voltage.

14. A method according to claim 12, wherein after the production of at least one ignition pulse within a half-wave of the supply voltage at least one further ignition pulse is produced within a subsequent half-wave upon the attainment of a predetermined instantaneous value of the supply voltage.

15. A method according to claim 14, wherein the input voltage of a trigger circuit for the production of the at least one ignition pulse is adjusted to be less in the subsequent half-wave in comparison with the input voltage for the production of the at least one ignition pulse in the preceding half-wave.

16. A method according to claim 12, wherein a capacitor arranged in parallel with the lamp is charged up after the termination of the charging of the energy storage means and prior to the production of the at least one ignition pulse by opening of the charging current path.

17. A method according to claim 12, wherein the charging current and/or the instantaneous voltage of the energy storage means is detected.

18. A method according to claim 17, wherein the input voltage of an ignition trigger circuit for producing the at least one ignition pulse is controlled in response to the detection of the charging current and/or to the detection of the instantaneous voltage of the energy storage means.

* * * * *